United States Patent
Hasegawa et al.

[11] Patent Number: 5,850,228
[45] Date of Patent: Dec. 15, 1998

[54] CHARACTER GENERATION WITH EXTRACTED AND TRANSFORMED SKELETON DATA

[75] Inventors: Susumu Hasegawa, Sakai; Masayuki Fujisawa, Yamatokoriyama; Yutaka Shigi, Nara; Yoshiko Imaki, Osaka; Minehiro Konya, Daito, all of Japan

[73] Assignee: Sharp Kabushiki Kaisha, Osaka, Japan

[21] Appl. No.: 684,229

[22] Filed: Jul. 19, 1996

[30] Foreign Application Priority Data

Jul. 31, 1995  [JP]  Japan ................................ 7-195036

[51] Int. Cl.⁶ ...................................................... G06F 15/00
[52] U.S. Cl. .......................................................... 345/471
[58] Field of Search ................................... 345/467–468, 345/471, 141

[56] References Cited

U.S. PATENT DOCUMENTS

| | | | |
|---|---|---|---|
| 4,897,638 | 1/1990 | Kokunishi et al. | 345/142 |
| 4,931,952 | 6/1990 | Uehara et al. | 345/467 |
| 5,257,016 | 10/1993 | Fujii et al. | 345/471 |
| 5,468,077 | 11/1995 | Motokada et al. | 400/76 |
| 5,673,064 | 9/1997 | Seto | 345/127 |

FOREIGN PATENT DOCUMENTS 202476  10/1985  Japan.

*Primary Examiner*—Phu K. Nguyen
*Attorney, Agent, or Firm*—Nixon & Vanderhye, P.C.

[57] ABSTRACT

A character pattern generating apparatus includes a memory and a CPU. The memory stores, in advance, character skeleton data representing the skeleton shapes of characters and element outline data representing the outline shapes of the elements constituting the characters for each character style. The CPU obtains outline shape data corresponding to one constituent element in character skeleton data from the element outline data, extracts therefrom element skeleton data for the constituent element, transforms the extracted element skeleton data based on the character skeleton data, and modifies the outline shape data in accordance with the transformation so as to generate a character pattern by using the modified outline data. The character pattern generating apparatus of the present invention generates multiple kinds of high quality fonts involving no design restrictions in a smaller number of steps.

13 Claims, 12 Drawing Sheets

| |
|---|
| 80 — THE NUMBER OF THE SKELETON POINT TO WHICH THE (1st) OUTLINE POINT BELONGS |
| ⋮ |
| THE NUMBER OF THE SKELETON POINT TO WHICH THE (Nth) OUTLINE POINT BELONGS |

CHARACTER GENERATION WITH EXTRACTED AND TRANSFORMED SKELETON DATA

BACKGROUND OF THE INVENTION

1. Field of the Invention

The present invention relates to a character pattern generating apparatus having characters in outline font and generating various kinds of character patterns.

2. Description of the Related Arts

A conventional character pattern generating apparatus such as disclosed in Japanese Laid-open (Kokai) Patent Publication No. Sho 60(1985)-202476 stores data on character shape described in a line figure showing a skeleton of a character figure and an outline shape of fundamental elements constituting the character style of the character figure as a plurality of parameters, and generates a character figure by modifying and combining the shape of the constituent element for each character kind based on the data on the character shape.

However, this method of storing the data on the shape of the constituent element as a plurality of element parameters forming the outline requires a professional knowledge on the element parameters and the registration operations in order to design and register these parameters. Therefore, it is difficult for those without such professional knowledge (e.g. as a character style designer) to modify these constituent elements.

Also the restriction in shape is involved in designing the constituent element makes it difficult to freely design character (e.g. to vary the character style). This difficulty is because the combination of the constituent elements in a single data on character shape is common to a plurality of character styles and does not correspond to change of the number of constituent elements per each character due to modification of the character style design. Moreover, modification of character style design increases the number of steps to design and register the constituent elements which should be deleted.

SUMMARY OF THE INVENTION

The present invention has been made in view of solving these problems and provides a character pattern generating apparatus for generating multiple kinds of high quality fonts involving no design restrictions in a small number of steps.

In order to solve the above problems, the character pattern generating apparatus according to the present invention stores, in advance, character skeleton data representing the character shape and element outline data representing the outline shape of elements constituting the character, and generates character patterns by modifying and combining the outline shapes of the constituent elements of the character on the basis of the character skeleton data.

Figure 1:
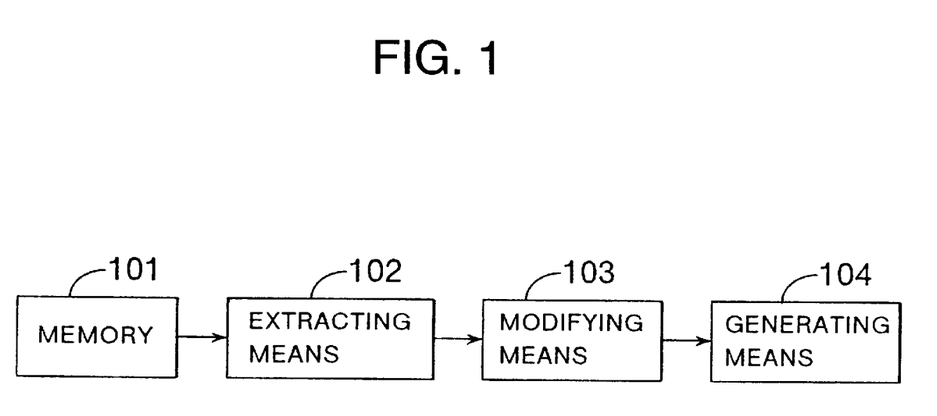
FIG. 1 is a block diagram showing a construction of the present invention.

In other words, as shown in FIG. 1, the present invention provides a character pattern generating apparatus comprising a memory 101 for storing, in advance, character skeleton data representing the skeleton shapes of the characters and element outline data representing the outline shapes of the elements constituting the characters for each character style, extracting means 102 for obtaining outline shape data corresponding to one constituent element in character skeleton data from the element outline data and extracting therefrom element skeleton data for the constituent element, modifying means 103 for transforming the extracted element skeleton data based on the character skeleton data and modifying the outline shape data in accordance with the transformation, generating means 104 for generating a character pattern by using the modified outline shape data.

DETAILED DESCRIPTION OF THE PREFERRED EMBODIMENTS

In the present invention, a microprocessor including a ROM, a RAM, and an I/O port is conveniently used for the extracting means 102, the modifying means 103, and the generating means 104. As the memory 101, a ROM is usually used.

In accordance with the present invention, the extracting means 102 obtains outline data corresponding to one constituent element in the character skeleton data from the element outline data, and extracts therefrom element skeleton data. The modifying means 103 transforms the extracted element skeleton data based on the character skeleton data, and modifies the outline data in accordance with the transformation. The generating means 104 generates a character pattern by using the modified outline data. Accordingly, it is possible to generate a character pattern simply by designing the element outline shape representing the outline of the constituent element.

In the above construction, the memory 101 is preferably constructed in such a manner that combination data of constituent elements for a plurality of character styles are stored in the character skeleton data of one character when storing the character skeleton data and the element outline data in advance.

Also, the extracting means 102 is preferably constructed so as to extract element skeleton data comprising a plurality of skeleton points and outline modification data necessary for the modification of the outline shape when extracting the element skeleton data corresponding to one constituent element of character skeleton data from the element outline data.

The present invention will be hereinafter detailed by way of examples in conjunction with the accompanying drawings, which are not to be construed as being intended to limit the scope of the present invention. The character pattern generating apparatus according to the present invention may be usually incorporated into a Japanese language word processor or a personal computer. However, the character pattern generating apparatus according to the present invention may be applied to English letters, Chinese characters, Hankul (Korean) characters, and the like. In such a case, the character pattern generating apparatus according to the present invention may be incorporated into an English word processor, a Chinese word processor, a Korean word processor, or the like.

EXAMPLES

Figure 2:
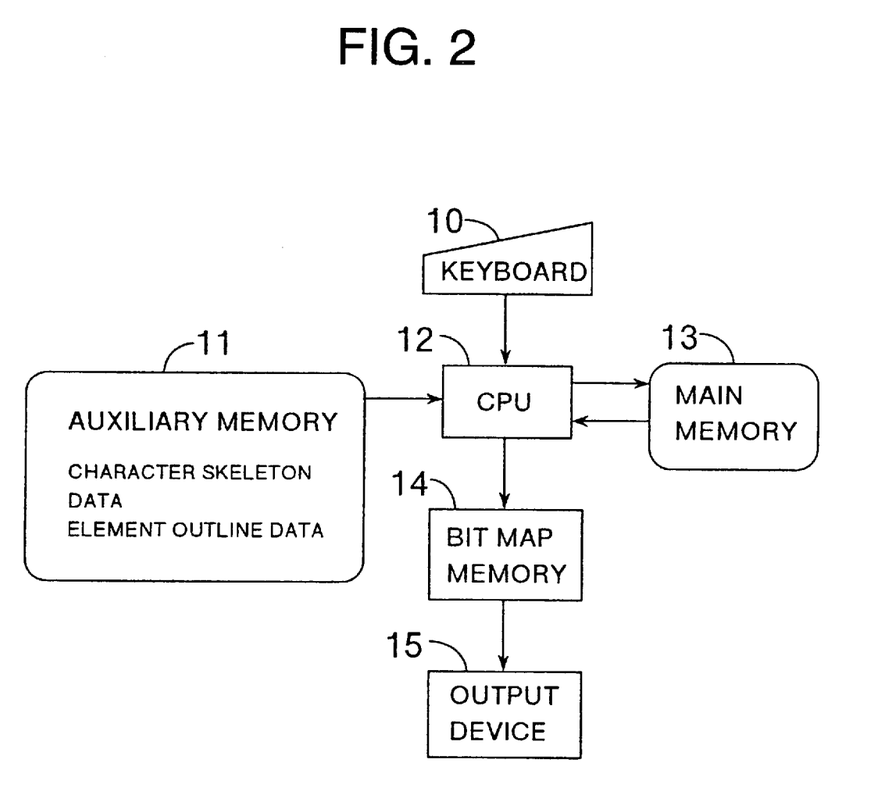
FIG. 2 is a block diagram showing a general construction of an embodiment of a character pattern generating apparatus according to the present invention.

FIG. 2 is a block diagram showing a general construction of an embodiment of character pattern generating apparatus according to the present invention. Referring to FIG. 2, the character pattern generating apparatus comprises a keyboard 10, an auxiliary memory 11, a CPU 12, a main memory 13, a bit map memory 14, and an output device 15 including a laser printer, a thermal printer, or the like.

The keyboard 10 is used for inputting the character code of a character to be generated and a character style code representing a character style such as a Ming type or a Gothic type. The auxiliary memory 11 stores, in advance, the character skeleton data representing the shapes of the characters and element outline data representing the outline shapes of constituent elements forming each of the characters.

The CPU 12 includes a function for extracting the element skeleton data, a function for modifying the outline shape of each of the constituent elements, and a function of generating a character pattern. Also, the CPU 12 comprises a memory for programs and a memory for work area for performing a control operation to generate character patterns based on each of the data in the auxiliary memory 11 and the main memory 13. These character patterns are expanded into bit map data on the bit map memory 14 and are outputted by printing via the output device 15 such as a laser printer or a thermal printer.

The main memory 13 comprises an input buffer for temporarily storing the character data read out from the auxiliary memory 11, an output buffer for temporarily storing the element outline data representing the modified shapes, a memory portion for storing the element skeleton data and the outline modification data.

The outline shape of a character is stored by employing, for example, (1) a method of storing the outline of the character by line approximation, (2) a method of storing the outline of the character by lines and circular arcs, (3) a method of storing the outline of the character by lines and curves. Among these methods, the method (3) is the most suitable for generating the character patterns considering the character quality, the efficiency of data volume, and others. In view of this, the outlines of each of the characters are stored by employing the above method (3) in this embodiment. Thus, the outline data of the characters stored by lines and curves are stored in the auxiliary memory 11 as coordinate data of outline points in the element outline data.

Next, the stored contents of the auxiliary memory 11 will be explained.

Figure 3:
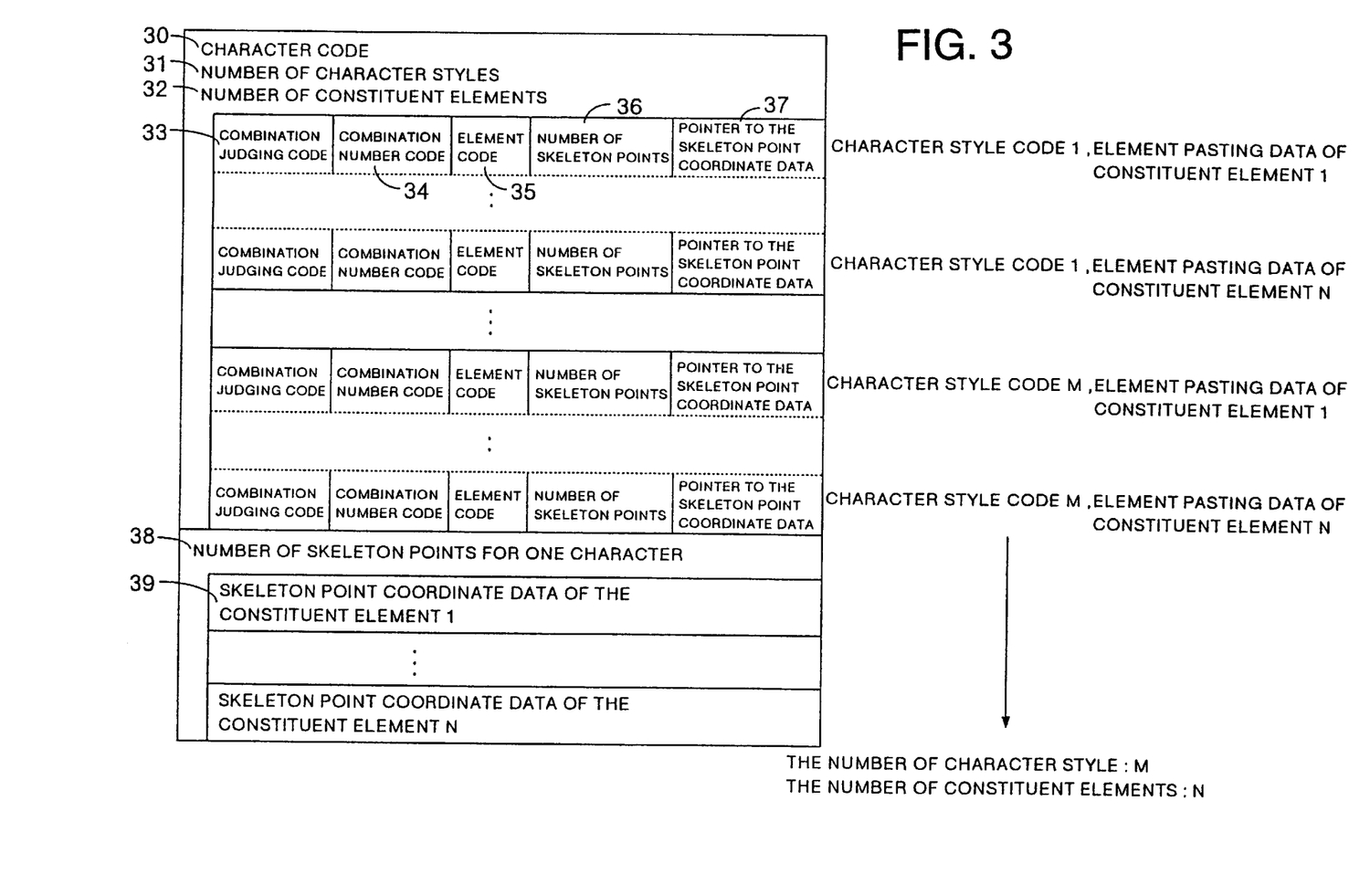
FIG. 3 is an explanatory view showing an example of stored character skeleton data according to the present invention.

FIG. 3 is an explanatory view showing an example of stored character skeleton data. The character skeleton data includes the character code 30 for differentiating character kinds, the number 31 of character styles generated from one character skeleton data, and the number 32 of constituent elements forming the character shape. Also, element pasting data are stored for every character style code and for every constituent element.

The element pasting data are stored by the number of character-constituting elements multiplied by the number of generated character styles. The element pasting data comprise a combination judging code 33 for judging whether a constituent element in the character is to be processed independently or in combination with other constituent elements, a combination number code 34 for indicating the group of the constituent elements to be combined, an element code 35 for indicating the element outline shape corresponding to the constituent element, a number 36 of skeleton points forming the constituent element, and a pointer 37 pointing to the skeleton point coordinate data. Here, the constituent elements having the same value of combination number code 34 have the same value of element code 35.

After the group of element pasting data, the skeleton point coordinate data are subsequently stored. These skeleton point coordinate data are stored in such a manner that the group of the skeleton point coordinate data 39 of constituent elements follows the number 38 of skeleton points of the character.

Figure 4:
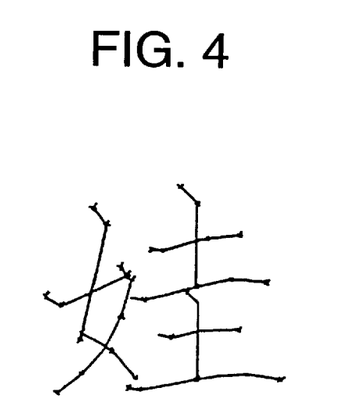
FIG. 4 is an explanatory view showing an example of geometrical information contained in character skeleton data for one character according to the present invention.
Figure 5:
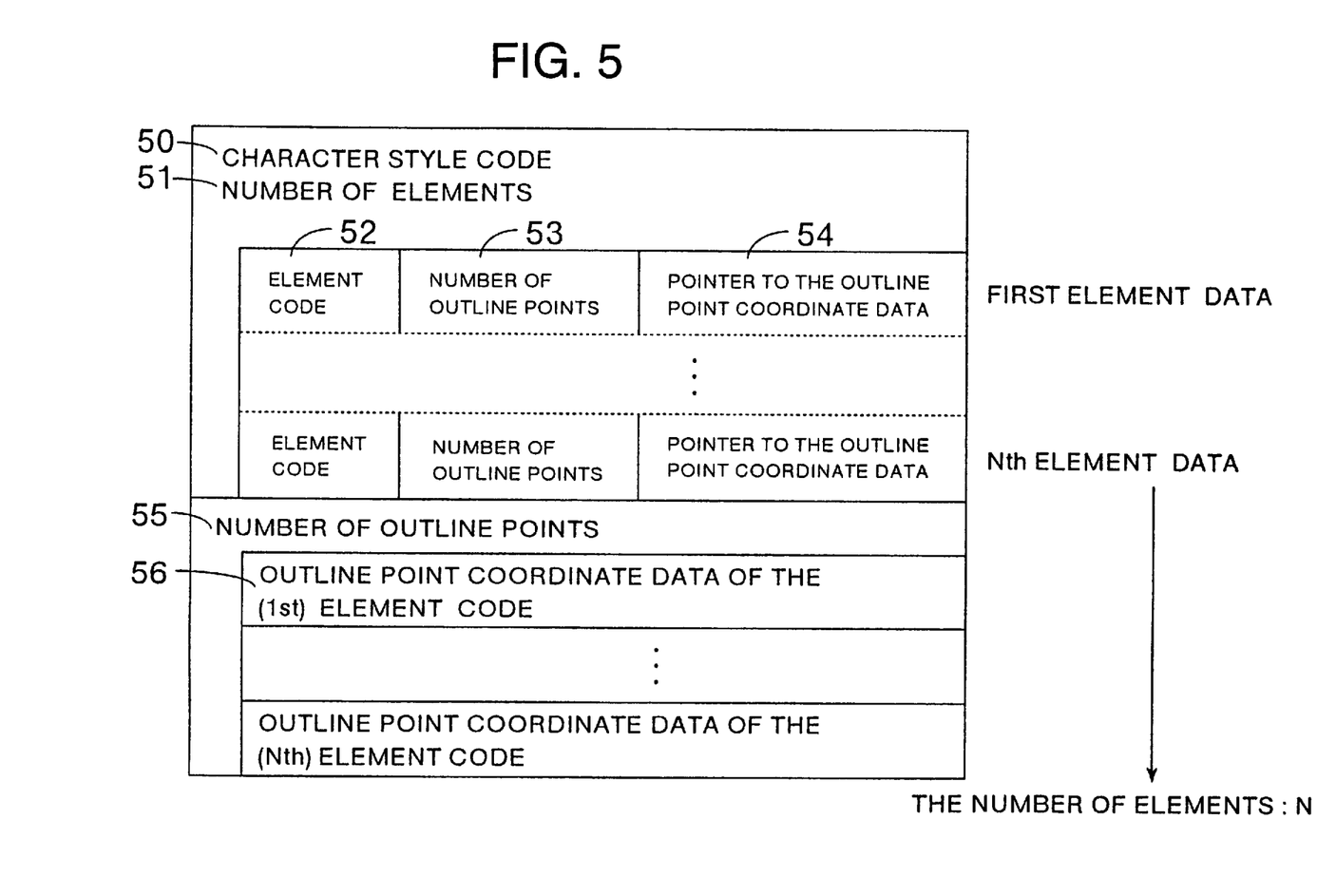
FIG. 5 is an explanatory view showing an example of stored element outline data according to the present invention.

FIG. 4 shows an example of geometrical information in a character skeleton data for one character. FIG. 5 is an explanatory view showing an example of stored element outline data. In the element outline data, a character style code 50 indicating the character style such as a Ming type or a Gothic type is first stored and then the number 51 of elements prepared for the character style is stored, followed by element data 1 to N, provided that the number of elements is N.

Namely, the element data are provided for each element and each of the element data comprises an element code 52, a number 53 of outline points constituting the outline, and a pointer 54 pointing to the outline point coordinate data. The group of element data are followed by the total number 55 of outline points and outline point coordinate data 56 of each element.

Figure 6A:
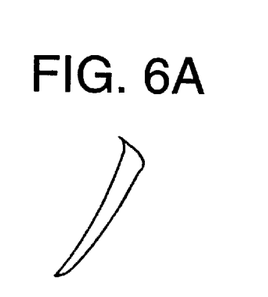
FIGS. 6A and 6B are views showing examples of geometrical information contained in element outline data for one element according to the present invention.
Figure 6B:
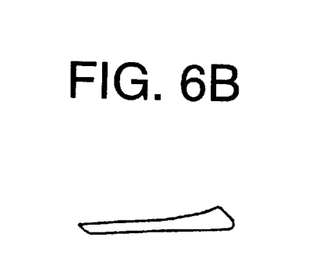

FIGS. 6A and 6B are views showing examples of geometrical information contained in element outline data for one element.

The operation of the thus constructed character pattern generating apparatus will be explained hereinafter in conjunction with the flowchart shown in FIGS. 7A and 7B.

Figure 7A:
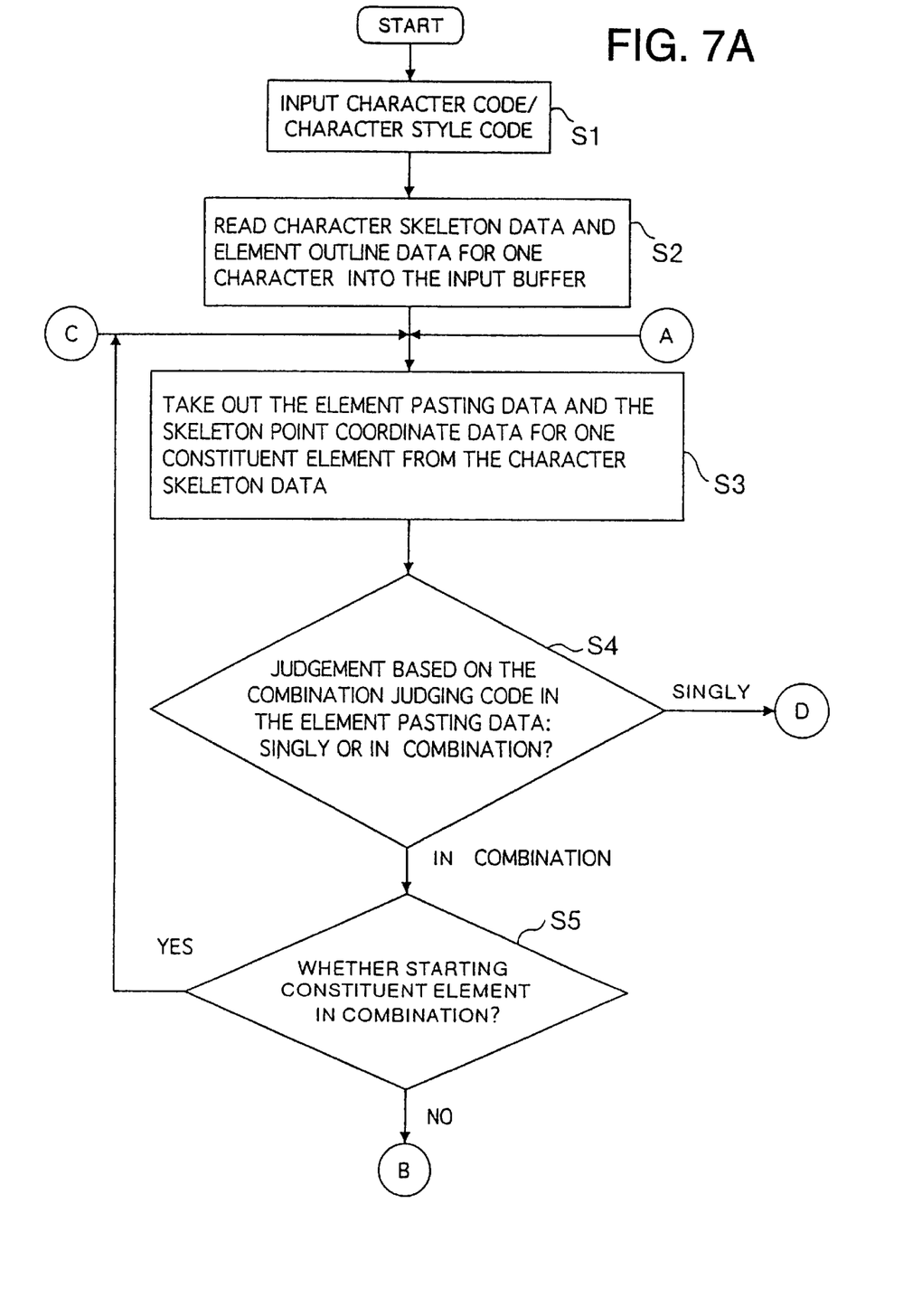
FIGS. 7A and 7B are flow charts showing the operation of an embodiment according to the present invention.
Figure 7B:
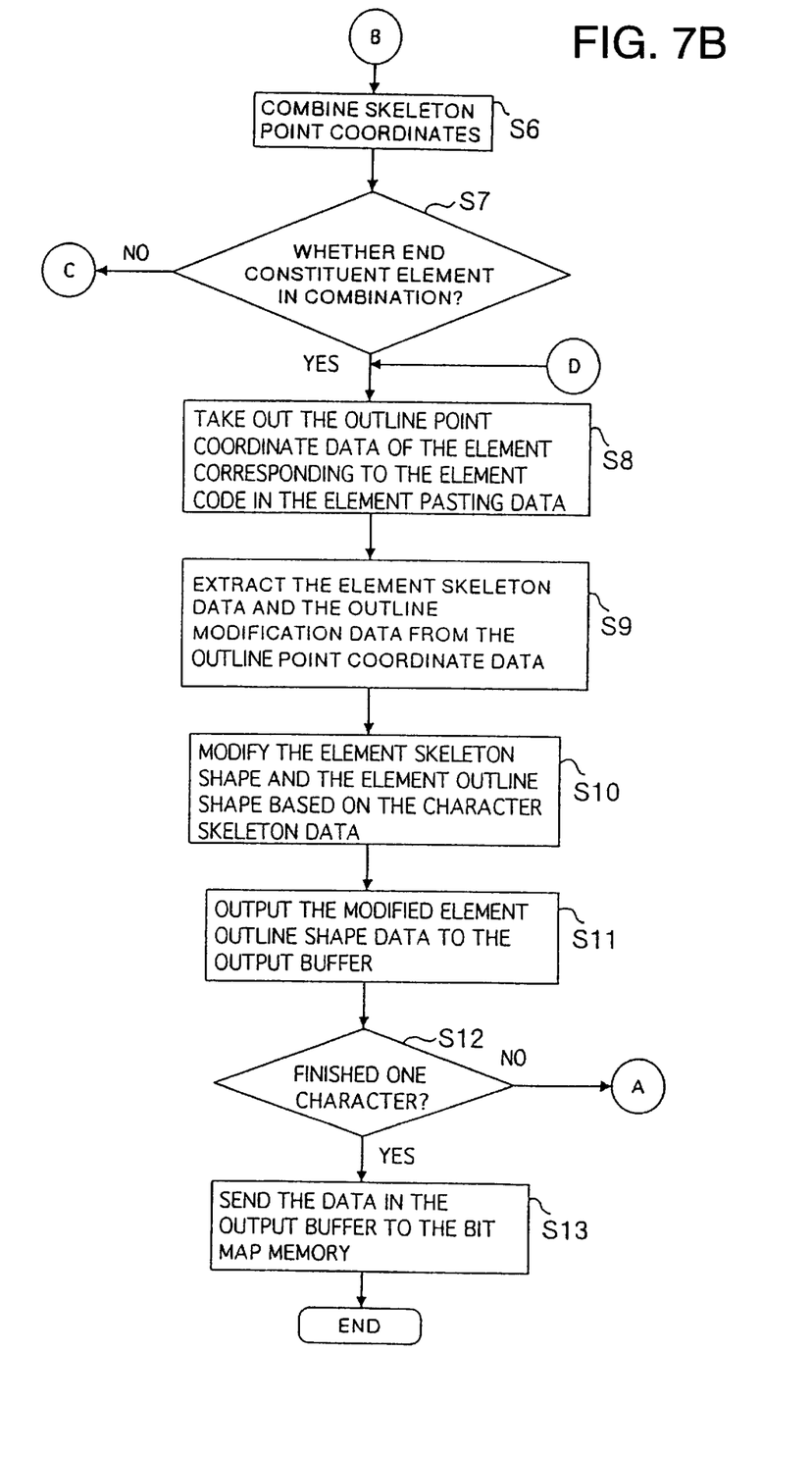

Referring to FIGS. 7A and 7B, the character code and the character style code of a character to be generated are inputted from the keyboard 10 (Step S1). The CPU 12 then reads, for each character, character skeleton data used for the generation process in accordance with the character code and also reads the element outline data corresponding to the character style code from the auxiliary memory 11 into the input buffer of the main memory 13 (Step S2).

Next, the CPU 12 takes in, among the character skeleton data, the element pasting data of the constituent elements corresponding to the character style code designated in Step S1 and the skeleton point coordinate data of the constituent element from the input buffer into the working memory within the CPU 12 (Step S3). The CPU 12 then judges, based on the combination judging code 33, whether the constituent element is to be processed singly or in combination with other elements (Step S4). If the element is to be singly processed, the flow proceeds to Step S8 and, if the element is to be processed in combination, the flow proceeds to Step S5.

In Step S5, the CPU 12 examines the combination number code 34 in the working memory to judge whether the constituent element is the starting element in the group of the constituent elements to be processed in combination. If the constituent element is the starting element, the flow goes back to Step S3 and the CPU 12 takes in the element pasting data and the skeleton point coordinate data of the next constituent element from the input buffer into the working memory within the CPU 12. If the constituent element is not the starting element, the flow proceeds to Step S6 and the CPU 12 combines the skeleton point coordinate data with the one previously taken in at Step S3.

In other words, the set of skeleton point coordinate data of a plurality of constituent elements is treated as skeleton point coordinate data of one constituent element. As previously described, since the combination number code 34 is common, the element code 35 has one identical value.

Further, in Step S7, the CPU 12 judges whether the constituent element is the end element or not. Here, if the constituent element is not the end element, the flow goes back to Step S3 and the CPU 12 takes in the element pasting data and the skeleton point coordinate data of the next constituent element from the input buffer into the working memory within the CPU 12. If the constituent element is the end element, the process of combining the skeleton point coordinate data will be ended and the flow proceeds to Step s8.

In Step S8, the CPU 12 takes in, from the element outline data read into the input buffer, the outline point coordinate data of the element corresponding to the element code 35 into the working memory within the CPU 12. The flow then proceeds to Step S9, in which the CPU 12 extracts the element skeleton data and the outline modification data from the outline point coordinate data.

Figure 8:
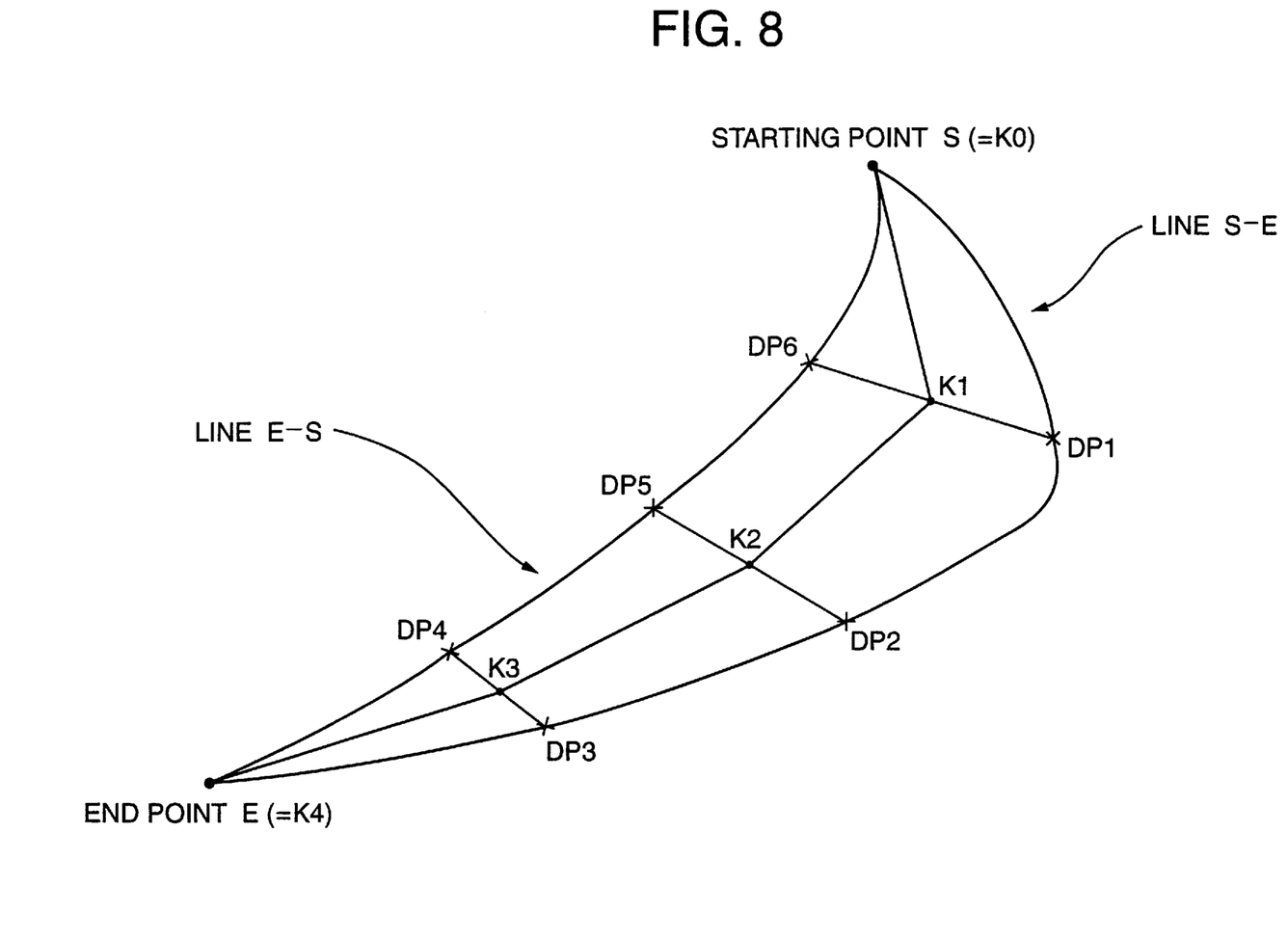
FIG. 8 is an explanatory view showing a process in extracting element skeleton data from the outline point coordinate data according to the present invention.

FIG. 8 shows a process of extracting element skeleton data from the outline point coordinate data. Referring to FIG. 8, the starting point S and the end point E are selected, as the starting and end coordinate points of the element skeleton data, from the outline point coordinate data, and the number of partitions in the outline is then determined based on the distance between the starting point S and the end point E. In this example, the outline is quadrisected (i.e. partitioned into four portions).

Next, with respect to the line S-E from the starting point S to the end point E and the line E-S from the end point E to the starting point S, equipartition points (DP1 to DP6) are generated on the respective outlines.

The starting point S is taken as the skeleton point K0. The midpoints of the lines connecting DP1 to DP6, DP2 to DP5, and DP3 to DP4 are taken to be the skeleton points K1, K2, and K3, respectively. The end point E is taken to be the skeleton point K4. The skeleton points K0 to K4 are stored as element skeleton data in the memory portion of the main memory 13. In this way, the element skeleton data are extracted from the outline point coordinate data.

Figure 9:
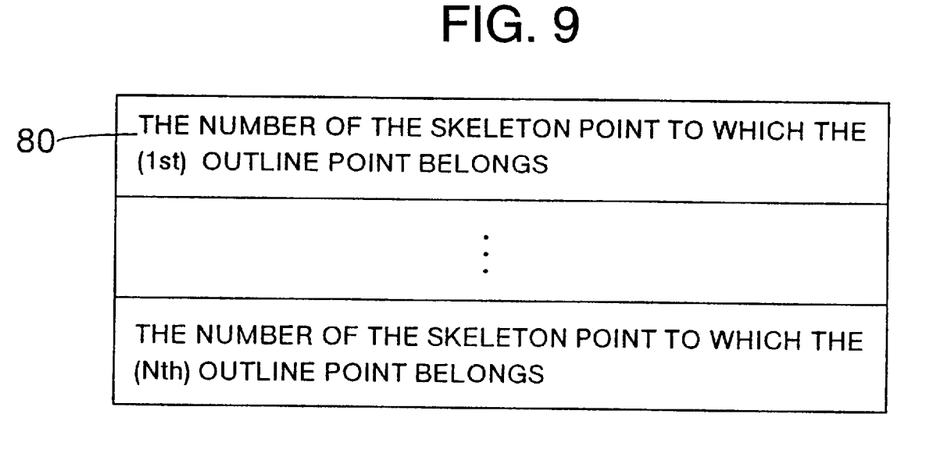
FIG. 9 is an explanatory view showing an example of storage of skeleton point numbers to which outline points belong according to the present invention.

After the element skeleton data are extracted, the outline modification data are determined. As the outline modification data, the number 80 of the skeleton point to which the outline point belongs is determined, as shown in FIG. 9.

Figure 10:
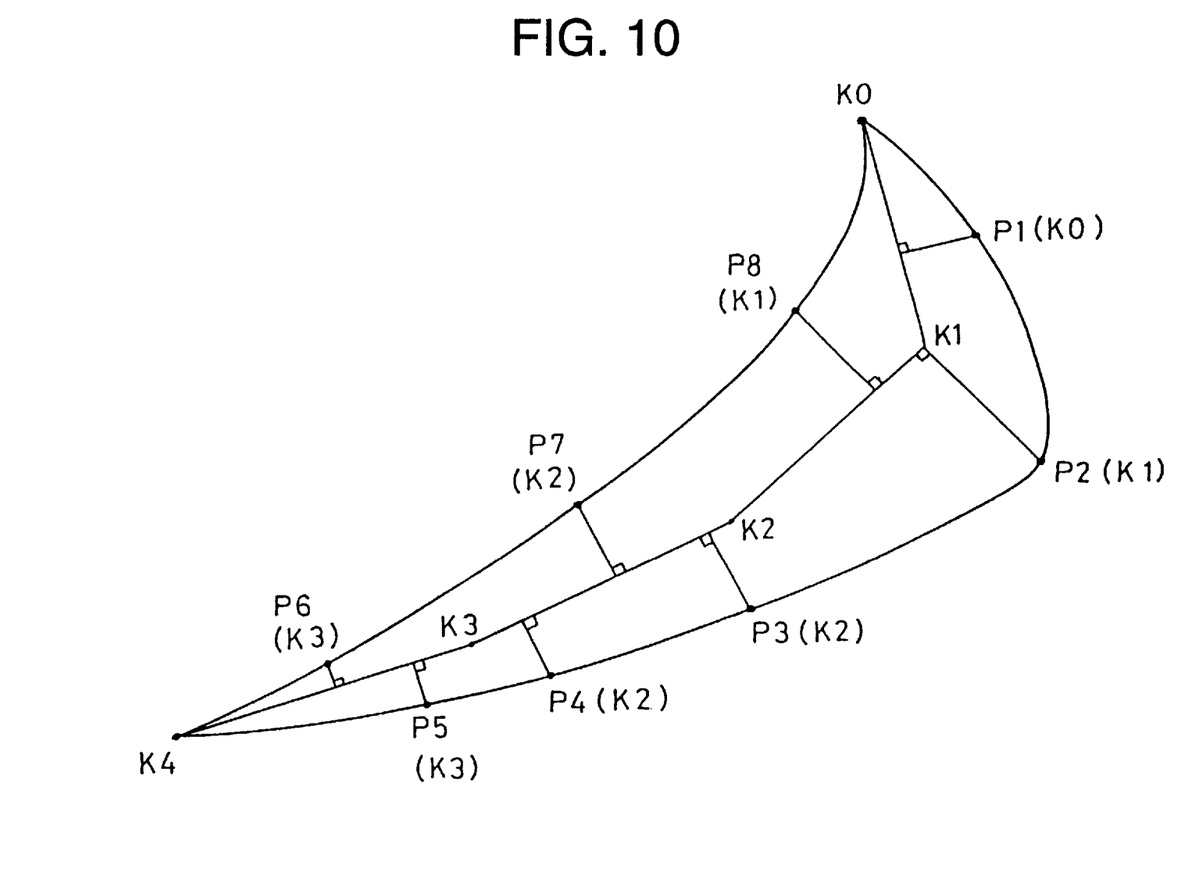
FIG. 10 is an explanatory view showing a process in obtaining skeleton point numbers to which outline points belong according to the present invention.

FIG. 10 shows a process of determining the skeleton point number to which the outline point belongs. Referring to FIG. 10, the CPU 12 generates the line segments K0-K1, K1-K2, K2-K3, and K3-K4 between the skeleton points K0, K1, K2, K3, and K4.

Next, for each outline point, the line segment to which the distance from the outline point is the shortest is determined based on the outline point coordinate data taken in into the working memory. The number of the skeleton point which is the starting point of the line segment is stored, as the skeleton point number 80 to which the outline point belongs, in the memory portion of the main memory 13.

The flow then proceeds to Step S10. Based on the skeleton point coordinate data of the constituent element in the character skeleton data taken in into the working memory within the CPU 12 in Step S3, the CPU 12 makes the coordinate value of each skeleton point of the element skeleton data extracted in Step S9 to be identical with the skeleton point coordinate data by means of enlargement, contraction, rotation, and others. The outline points P1 to P8 are then transferred in accordance with the movement of the line segments K0-K1, K1-K2, K2-K3, and K3-K4 in the element skeleton data.

The transferring of the outline points will be explained hereinafter in detail by referring to FIG. 11.

The outline modification data show that, when the line segment K3-K4 moves to K3'-K4', the outline points P5 and P6 (the number of the skeleton point to which the outline points P5 and P6 belong is (K3)) are to be transferred. The condition of the transfer of the outline points P5 and P6 are as follows.

(1) The feet of the perpendiculars from the outline points P5 and P6 to the line segment K3-K4 are set to be CP1 and CP2, respectively. The lengths of the line segments K3-CP1, CP1-CP2, and CP2-K4 are set to be L1, L2, and L3, respectively.

The points CP1' and CP2' will be generated on the line segment K3'-K4' in proportion to the ratio L1:L2:L3 of the line segment K3-K4 (the skeleton point K3' is the same as the skeleton point K3). Here, the lengths of the line segments K3'-CP1', CP1'-CP2', and CP2'-K4' are assumed to be L1', L2', and L3', respectively.

(2) Assume the distances from the points P5 and P6 to the line segment K3-K4 to be D5 and D6, respectively, and the points P5 and P6 will be transferred to the points P5' and P6' away from the points CP1' and CP2' obtained in (1) in a direction perpendicular to the line segment K3'-K4' by distances of D5 and D6, respectively.

Figure 11:
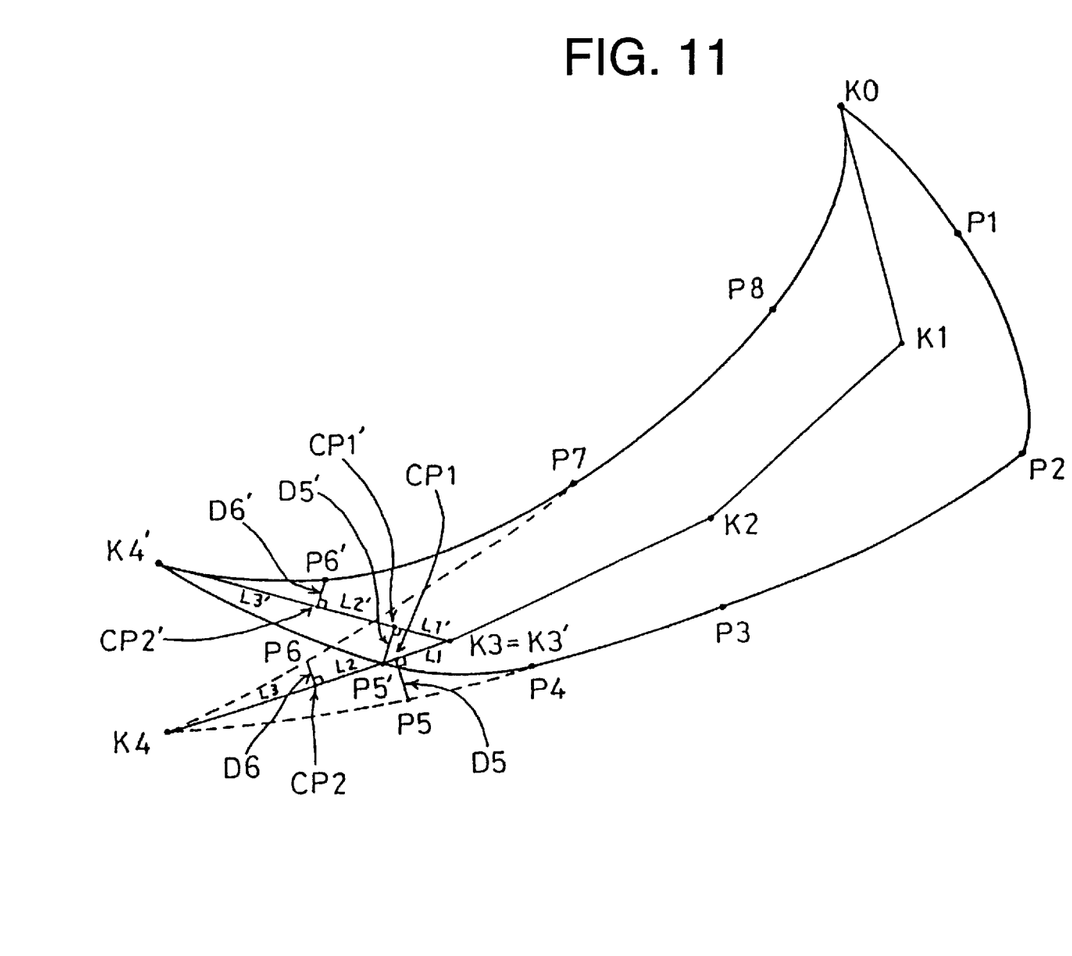
FIG. 11 is an explanatory view showing a transfer of outline points according to the present invention.

Namely, in FIG. 11, the conditions for the transferring of the points P5 and P6 are:
(a) the length ratio L1:L2:L3=L1':L2':L3',
(b) the distance D5=D5' and the distance D6=D6'.

By this process of transferring outline points satisfying the above conditions (a) and (b), the element outline shape can be modified in accordance with the character skeleton shape.

After the transferring process of all the outline points in the constituent element is finished, the transferred outline points P1' to P7' will be outputted to the output buffer of the main memory 13 in Step S11.

Further, in Step S11, the CPU 12 judges whether all the constituent elements in the character are processed or not. If the judgement is "Yes", the flow proceeds to Step S12, in which the data in the output buffer of the main memory 13 are sent to the bit map memory 14 to finish the process. If the judgement is "No", the flow goes back to Step S3 so that the element pasting data and the skeleton point coordinate data of the next constituent element is taken in from the input buffer into the working memory within the CPU 12.

The outline point data sent to the bit map memory 14 will be expanded into bit map data to be printed and outputted by the output device 15 such as a laser printer, a thermal printer, or the like.

In this way, the element skeleton data corresponding to one constituent element in character skeleton data are extracted from the element outline data (see Step S9). The extracted element skeleton data are transformed based on the character skeleton data (obtained at Step S3) and, in accordance with the transformation (performed at Step S10), the outline shape data are modified (see FIG. 10). The character pattern is then generated by using the modified outline shape data.

This makes it possible to develop a character style in a smaller number of steps because character patterns can be generated by only designing the element outline shapes representing the outlines of the constituent elements when compared with the prior art font developing methods in which all the character patterns must be designed. Further, since the element outline shapes are to be modified, the element outline shapes can be used in common, making it possible to decrease the number of element outline shapes necessary for developing one character style.

Also, since a combination of a plurality of constituent elements can be achieved in a single character kind, the element shapes can be designed without difficulty, so that it is possible to generate a group of character styles having a high quality and being rich in variety, whereby the generated character styles can be diversified based on a single skeleton shape data. Also, a design intended to decrease the number of element shapes by a combination of constituent elements can decrease the volume of the character style data.

Figure 12A:
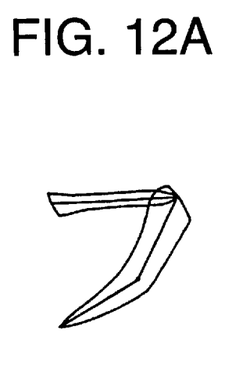
FIGS. 12A and 12B are explanatory views showing an example in which constituent elements are independently processed and an example in which a plurality of constituent elements are processed in combination.
Figure 12B:
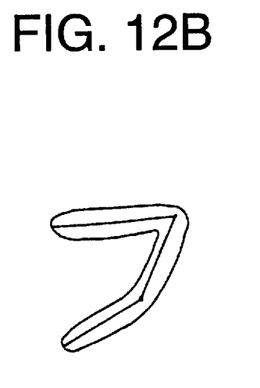

FIGS. 12A and 12B show an example in which constituent elements are independently processed and an example in which a plurality of constituent elements are processed in combination.

Moreover, the present invention is constructed in such a manner that the element skeleton data are extracted from the element outline data and, from these element skeleton data, the outline modification data necessary for the modification of the outline shape are extracted, so that only the data related to the outline shape of the elements must be stored in the auxiliary memory 11, and it is not necessary to retain the element parameters whose shapes can hardly be imagined visually. Therefore, the character style designer should design only the outline shapes, so that the designer needs no professional knowledge of the element parameters or the operation for their registration.

According to the present invention, the element skeleton data corresponding to one constituent element in character skeleton data are extracted from the element outline data, the extracted element skeleton data are transformed based on the character skeleton data and, in accordance with the transformation, the outline shape data are modified so as to generate the character pattern by using the modified outline shape data. This removes the need to design all the character patterns and makes it possible to generate character patterns by only designing the element outline shapes representing the outlines of the constituent elements. Because of this, a character style can be developed in a smaller number of steps. Further, since the element outline shapes are to be modified, the element outline shapes can be used in common, making it possible to decrease the number of element outline shapes necessary for developing one character style.

What we claim is:

1. A character pattern generating apparatus comprising:
    a memory for storing, in advance, character skeleton data representing the skeleton shapes of the characters and element outline data representing the outline shapes of the elements constituting the characters for each character style;
    extracting means for obtaining outline shape data corresponding to one constituent element in character skeleton data from the element outline data and extracting therefrom element skeleton data for the constituent element;
    modifying means for transforming the extracted element skeleton data based on the character skeleton data and modifying the outline shape data in accordance with the transformation; and
    generating means for generating a character pattern by using the modified outline shape data.

2. A character pattern generating apparatus according to claim 1, wherein the memory stores, in the character skeleton data of one character, combination data of constituent elements for a plurality of character styles when storing the character skeleton data and the element outline data in advance.

3. A character pattern generating apparatus according to claim 1, wherein the extracting means extracts element skeleton data comprising a plurality of skeleton points and outline modification data necessary for the modification of the outline shape when extracting the element skeleton data corresponding to one constituent element of character skeleton data from the element outline data.

4. A character pattern generating apparatus according to claim 1, wherein the element outline data includes outline point coordinate data obtained by expressing the outline shape of the constituent element constituting the character with the coordinates of a line figure formed of lines and curves for each character style.

5. A character pattern generating apparatus according to claim 1, wherein the character skeleton data includes skeleton point coordinate data obtained by expressing the skeleton shape of the character with the coordinates of skeleton points for each constituent element.

6. A character pattern generating apparatus comprising:
    a memory for storing, in advance, character skeleton data representing skeleton shapes of characters and element outline data representing outline shapes of elements constituting the characters for each character style;
    a processor which (1) obtains outline shape data corresponding to one constituent element in character skeleton data from the element outline data and extracts therefrom element skeleton data for the constituent element; (2) transforms the extracted element skeleton data based on the character skeleton data and modifies the outline shape data in accordance with the transformation; and (3) generates a character pattern by using the modified outline shape data.

7. A character pattern generating method comprising:
    storing, in a memory, character skeleton data representing skeleton shapes of characters and element outline data representing outline shapes of elements constituting the characters for each character style;
    upon inputting of a character code and a character style code of a character to be generated, obtaining outline shape data corresponding to one constituent element in character skeleton data from the element outline data and extracting therefrom element skeleton data for the constituent element;

transforming the extracted element skeleton data based on the character skeleton data and modifying the outline shape data in accordance with the transformation; and generating a character pattern by using the modified outline shape data.

8. The method of claim 7, wherein the step of obtaining outline shape data comprises obtaining element pasting data of the constituent element corresponding to the character style code and skeleton point coordinate data of the constituent element.

9. The method of claim 8, further comprising determining whether the constituent element is to be processed singly or in combination with other elements.

10. The method of claim 7, wherein the element skeleton data for the constituent element is extracted by the following steps:

obtaining outline point coordinate data of the constituent element from the element outline data;

selecting a starting point and an end point of the element skeleton data from outline point coordinate data;

partitioning a line running between the starting point and the end point; forming connecting lines to connected pairs of selected outline points of the outline point coordinate data, the connecting lines intersecting the line running between the starting point and the end point;

determining skeleton points whereat the connecting lines intersecting the line running between the starting point and the end point and using the skeleton points to determine element skeleton data.

11. The method of claim 7, wherein, in extraction of the element skeleton data for the constituent element, skeleton points are determined, and wherein the step of transforming the extracted element skeleton data based on the character skeleton data comprises:

for each of plural outline points obtained from the element outline data, determining a skeleton point number to which the outline point belongs;

establishing a relationship between a coordinate value of each skeleton point of the extracted element skeleton data with skeleton point coordinate data of the constituent element in the character skeleton data.

12. The method of claim 11, wherein the relationship is one of enlargement, contraction, or rotation.

13. The method of claim 11, wherein the step of modifying the outline shape data in accordance with the transformation comprises transferring the outline points.

* * * * *